Sept. 20, 1960 R. F. DENTON 2,953,653
ELECTRICAL SWITCHING MECHANISM
Filed June 24, 1959 5 Sheets-Sheet 3
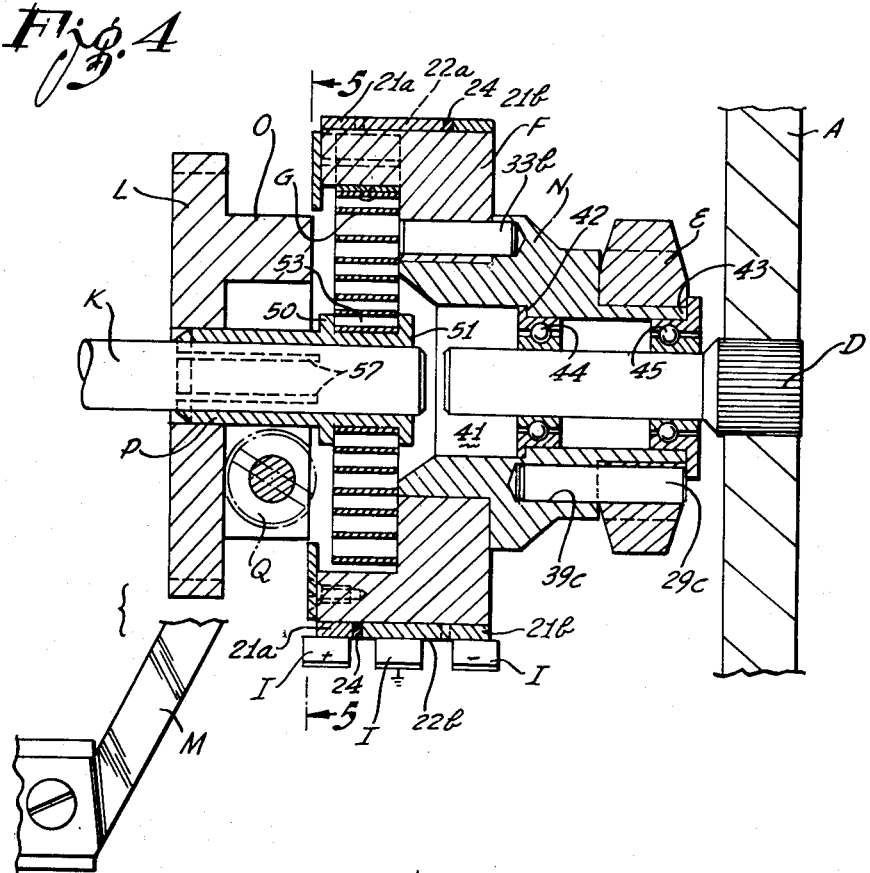
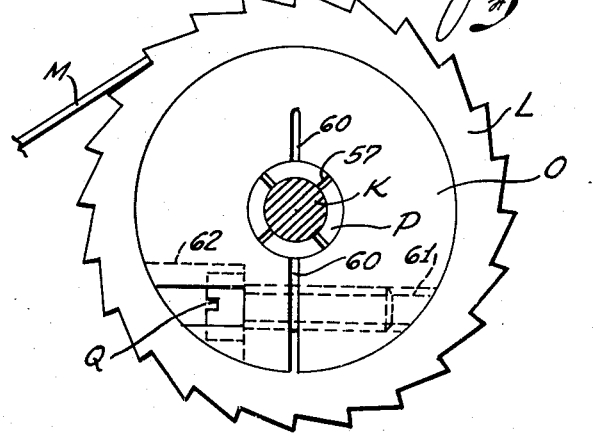
INVENTOR:
Robert F. Denton
By Gene W. Arant
Attorney Sept. 20, 1960 R. F. DENTON 2,953,653
ELECTRICAL SWITCHING MECHANISM
Filed June 24, 1959 5 Sheets-Sheet 4
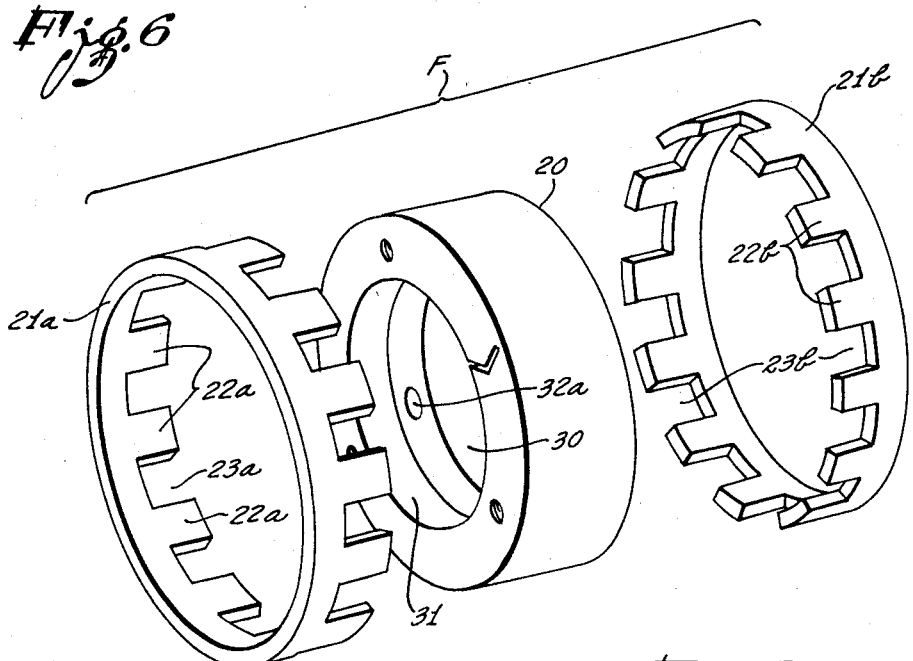
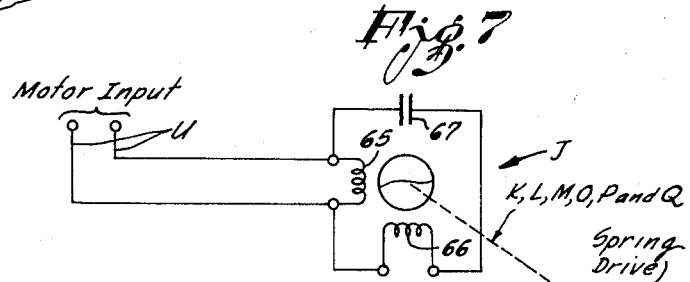
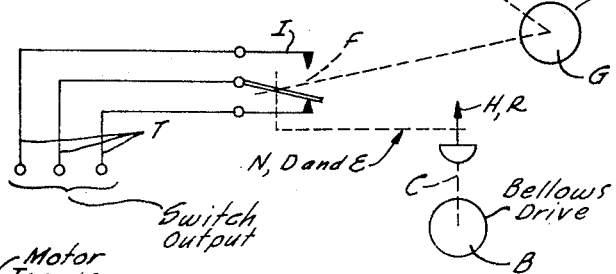
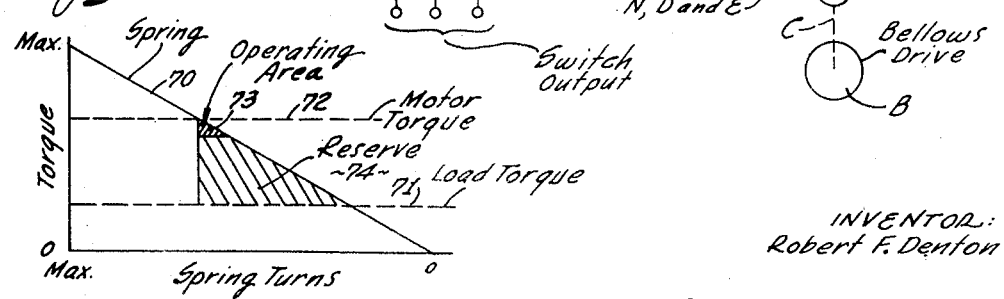
INVENTOR:
Robert F. Denton
By Gene W. Arant
Attorney Sept. 20, 1960  R. F. DENTON  2,953,653
ELECTRICAL SWITCHING MECHANISM
Filed June 24, 1959  5 Sheets-Sheet 5
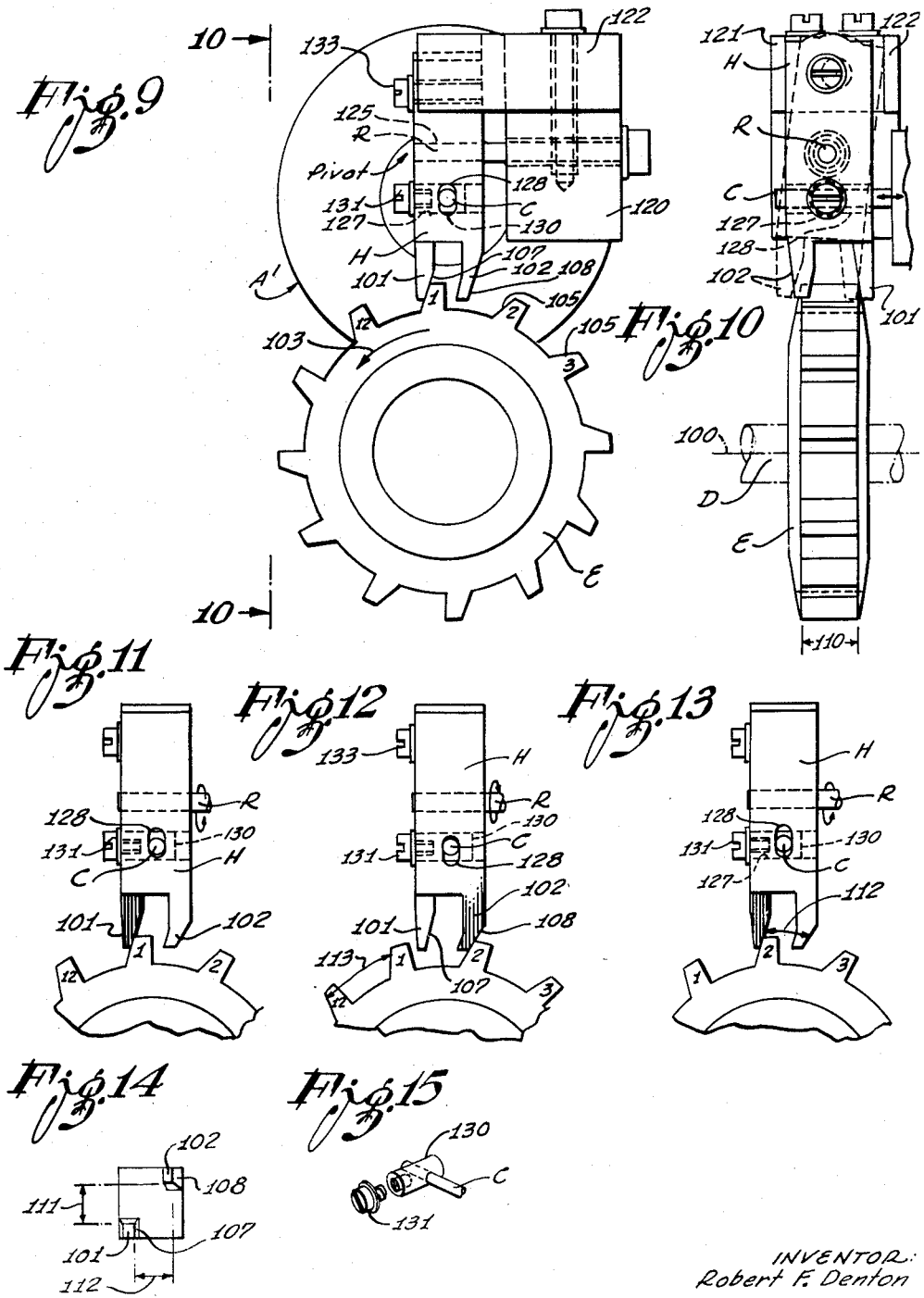
INVENTOR.
Robert F. Denton
By Gene W. Avant
Attorney ns

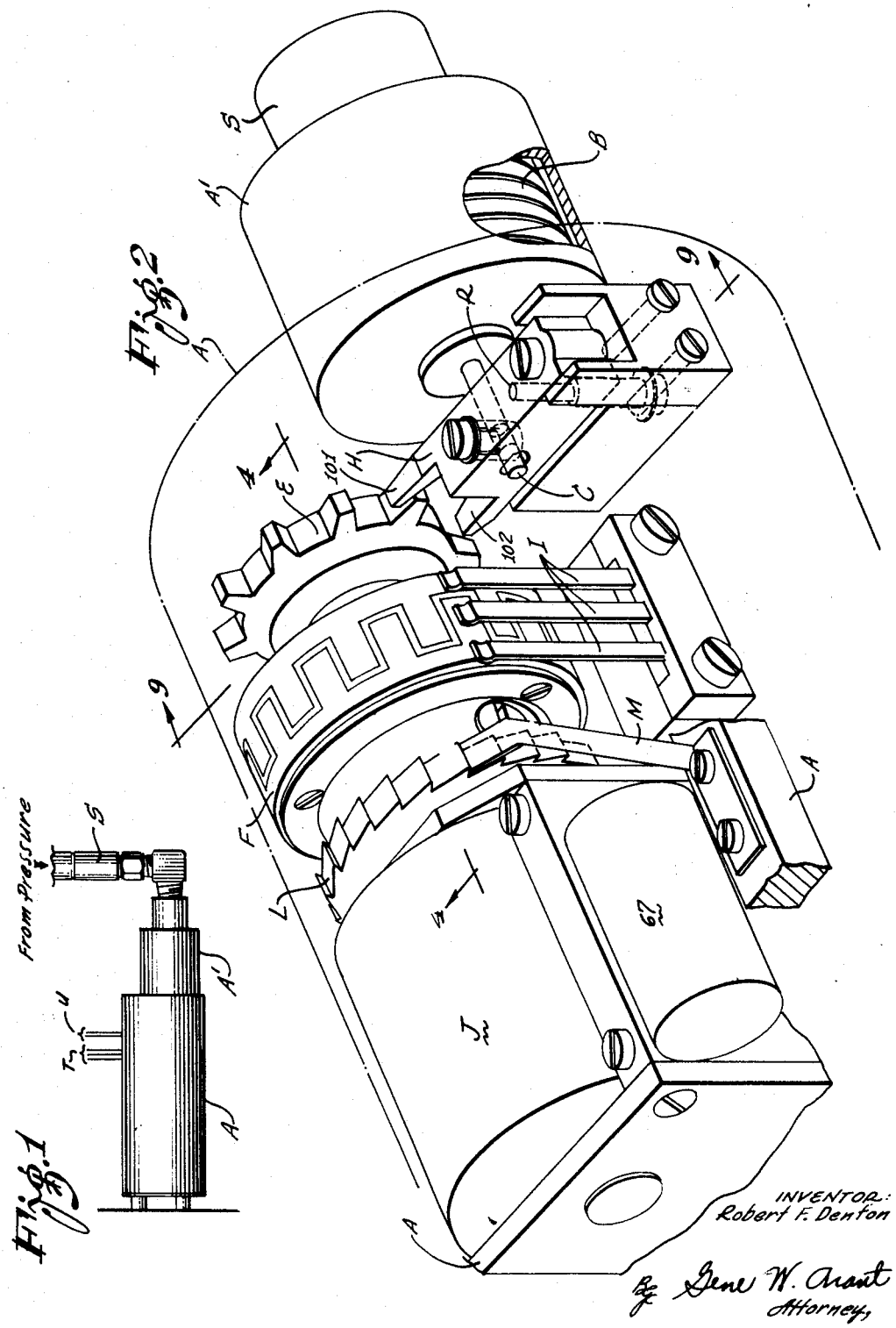

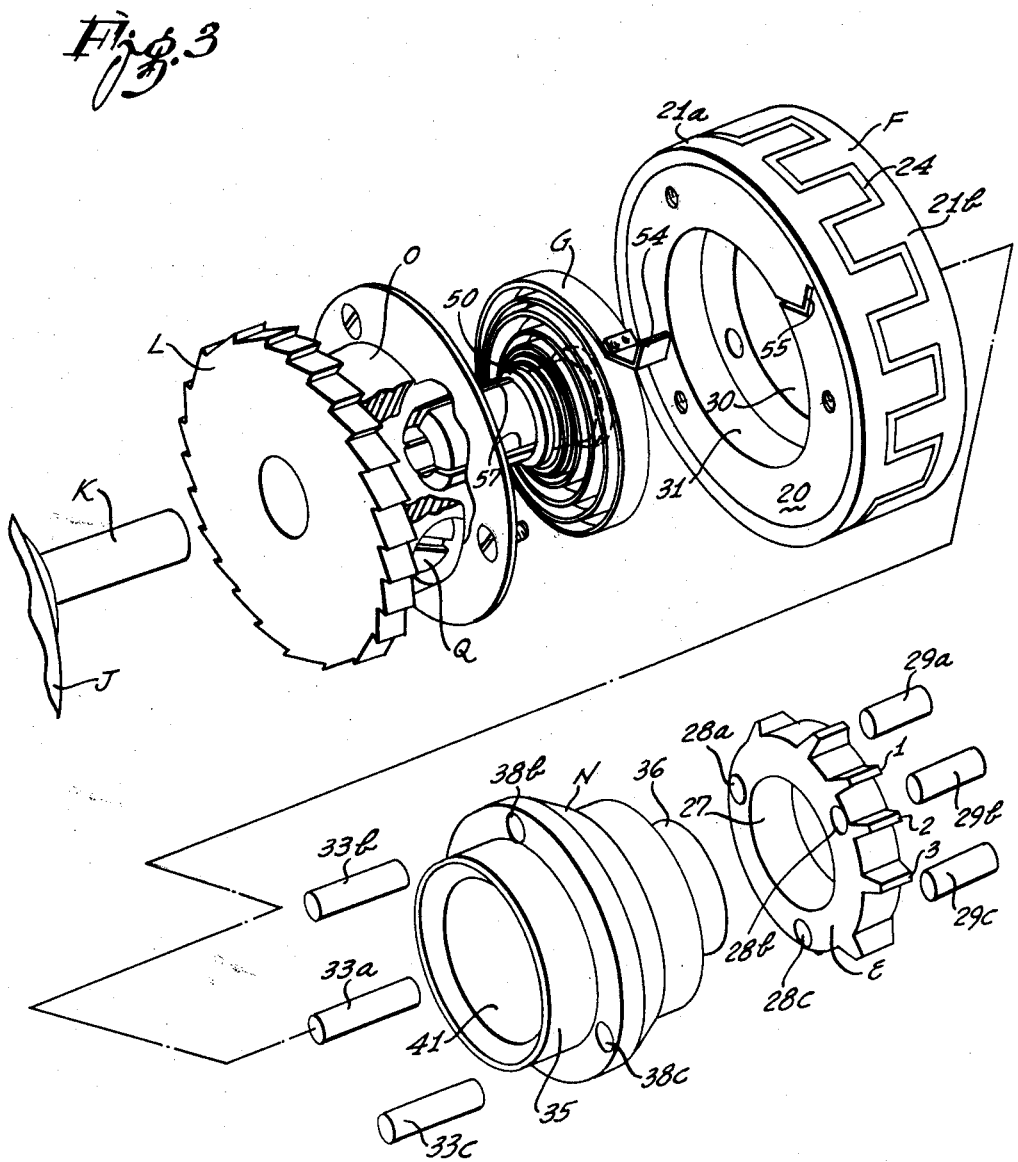

United States Patent Office 2,953,653
Patented Sept. 20, 1960

2,953,653
ELECTRICAL SWITCHING MECHANISM

Robert F. Denton, Los Angeles, Calif., assignor to Jamieson Laboratories, Inc., a corporation of California Filed June 24, 1959, Ser. No. 822,643

8 Claims. (Cl. 200—33)

The present invention relates to an electrical switching mechanism which receives driving energy from a source other than the switch input and continuously stores a reserve supply thereof.

In various control applications the continuous conversion of information from mechanical to electrical form is achieved by some type of switching mechanism. Not only are accuracy and precision of the mechanism itself essential, but minimum loading on the driving source is also desired. Furthermore, operational reliability may be adversely affected by environmental factors such as shock and vibration, or wide temperature variations, particularly in military or aircraft applications.

One object of the invention, therefore, is to provide an electrical switching mechanism adapted for continuously converting information from mechanical to electrical form and which imposes a minimum loading on the driving source.

Another object of the invention is to provide an electrical switching mechanism adapted for continuous operation under severe conditions of shock and vibration.

A further object of the invention is to provide a continuously operable converter mechanism responsive to motion of a movable member along a linear path for producing a binary electrical output signal which continuously indicates the relative position of the member on the path.

Yet another object of the invention is to provide an electrical switching mechanism which is independently powered from a separate electrical energy source, and which includes means for storing a reserve supply of driving energy usable in the event of failure of the electrical energy source.

According to the present invention a multiposition electrical switching member is driven by a spring, which causes the switching member to move from one position to another in a predetermined sequence of separate steps of its operating cycle. A normally energized, electrically driven means is provided for automatically maintaining the driving energy of the spring. In the event of failure of the electrical power source the stored energy of the spring assures continued operation of the switching mechanism for a substantial number of switch actuations. An escapement means, cooperatively associated with the switching member for normally inhibiting its advancement, is selectively operable under control of a movable input member for permitting the switching member to advance a step at a time.

Thus, according to the invention the energy supplied by a movable input member need not be sufficient for driving the moving parts which actually accomplish the switching operations, and furthermore, undesired interaction between the mechanical input and the electrical output is substantially eliminated by the intervention of the escapement and spring.

In the presently preferred form of the invention a rotary electrical switching member is utilized, with the spring being helically wound and substantially coaxially aligned therewith. An electric motor having an output shaft coupled to the spring is continuously energized so as to continuously maintain the driving energy of the spring. Ratchet means associated with the output shaft prevent the spring from unwinding in the event of a failure of the supply of power to the motor.

An additional feature of the presently preferred form of the invention is the utilization of escapement means comprising a toothed escapement wheel rigidly and coaxially coupled to the electrical switching member, and an escapement pawl whose operative portion reciprocates across the periphery of the escapement wheel along a path which is substantially parallel to the common axis of the escapement wheel and switching member. Furthermore, resistance to shock and vibration is assured by the fact that the escapement pawl is mounted for pivotal movement about an axis which lies perpendicular to the axis of the escapement wheel and switching member.

The objects and advantages of the invention will be more clearly understood from the following description considered in conjunction with the accompanying drawings, in which:

Figure 1 is an exterior view of the housing containing a preferred form of the invention, illustrated as being combined with a pressure responsive device to provide a pressure control apparatus;

Figure 2 is a partially cut away, perspective view of the apparatus contained within the housing of Figure 1;

Figure 3 is an exploded perspective view of a major portion of the components of the switching mechanism of Figure 2, specifically including those components which in their operating position are substantially coaxially aligned on a common axis;

Figure 4 is a cross-sectional elevational view of the switching mechanism of Figure 2 taken on the line 4—4 thereof;

Figure 5 is a transverse cross-sectional view of the mechanism of Figure 4 taken on the line 5—5 thereof;

Figure 6 is an exploded perspective view of the component parts of the switching member or commutator which in Figures 2, 3 and 4 is shown only in fully assembled form;

Figure 7 illustrates in schematic form both the electrical and mechanical connections between the various portions of the pressure control apparatus of Figures 1 and 2;

Figure 8 is a graph illustrating the energy storage function of the spring utilized in the invention;

Figure 9 is a transverse cross-sectional view of the apparatus of Figure 2 taken on the line 9—9 thereof, illustrating the escapement mechanism;

Figure 10 is a side view of the escapement mechanism taken on the line 10—10 of Figure 9;

Figures 11, 12 and 13 are partial views like Figure 9, illustrating successive relative positions of the escapement pawl and escapement wheel;

Figure 14 is an end view of the escapement pawl showing the location of the pawl teeth; and Figure 15 is a perspective view of the coupling arrangement for driving the escapement pawl.

Reference is now made to the drawings and particularly to Figures 1 through 4 thereof for a description of the physical layout of the invention, as utilized in a pressure control apparatus.

As shown in Figure 1 a cylindrical housing A has a smaller cylindrical housing A' rigidly fastened in an eccentric position to one end thereof, a pressure line S being in turn coupled to the outer end of housing A'. A 3-wire electrical circuit T and a 2-wire electrical circuit U are brought from within housing A to the exterior thereof. Housing A contains the electrical switching mechanism of the present invention. Housing A' contains a pressure responsive device B which may, for example, be an extensible bellows such as is shown in Figure 2.

Within the switching mechanism a multi-position electrical switching member F, also referred to as the commutator, is mounted for rotary movement. A helically wound spring G is drivingly coupled to electrical switching member F. A toothed escapement wheel E is rigidly coupled to the electrical switching member F, both being rotatably mounted upon a shaft D. An escapement pawl H normally engages escapement wheel E for inhibiting rotation of the electrical switching member F, the escapement pawl H being selectively disengageable for permitting switching member F to rotate a step at a time. A movable member C driven by bellows B constitutes a selectively operable means for driving the escapement pawl H.

An electric motor J energized continuously from circuit U is also coupled to spring G. The function of motor J is to automatically rewind spring G so as to maintain the driving energy thereof. A switch means I is cooperatively associated with electrical switching member F to provide different switching conditions for different rotational positions of member F. In the embodiment illustrated herein switch means I includes three electrical contact elements which slidingly engage the surface of switching member F. The switch contact elements I are respectively connected to the conductors of circuit T which therefore serves as an output circuit, providing different switching conditions for the various rotational positions of electrical switching member F.

Motor J has an output shaft K which is mechanically coupled to a ratchet wheel L as well as to the inner end of helical spring G. A ratchet pawl M engages ratchet wheel L so as to permit the ratchet wheel, as well as the associated parts coupled to it, to rotate only in such a direction as to wind spring G. Since motor J is continuously energized spring G is rewound after each one or two steps of rotation of the switching member F. The driving energy of spring G is therefore continuously maintained, and in the event of a power failure to motor circuit U a large number of switching operations can be accomplished before the energy of the spring is spent.

With further reference to Figures 2 through 5 inclusive, motor J is suported from one end of housing A, and shaft D from the opposite end thereof, in such manner that output shaft K and shaft D are substantially coaxially aligned.

Any inaccuracy in the alignment is readily taken up by the spring G. Escapement pawl H is supported in a suitable manner from housing A, as are also the switch contacts I and ratchet pawl M.

Escapement wheel E and electrical switching member F are longitudinally spaced apart, but are rigidly coupled together by means of a hub N positioned therebetween. Escapement wheel E is supported adjacent the fixed end of shaft D which is attached to housing A, and shaft D also extends concentrically through coupling hub N in supporting relationship therewith. Switching member F on its end furthest from escapement wheel E is recessed so as to internally receive the helically wound spring G, the outer end of spring G being mechanically coupled to member F.

Ratchet wheel L has a hub O formed integrally therewith, the composite structure having a concentric longitudinal bore adapted to receive a spring collet or sleeve P. Spring collet P in turn fits over the shaft K so that ratchet wheel L is adjacent the motor J. The outer end of spring collet P, which rides on the outer end of motor shaft K, has a parallel pair of circumferential flanges thereon providing a spool upon which spring G is wound, the inner end of the spring being firmly fastened to the spring collet P. A clamping screw Q is provided on ratchet wheel hub O for clamping the hub upon the associated end of spring collet P, and for simultaneously clamping the collet tightly upon shaft K, so as to rigidly secure both ratchet wheel L and the inner end of spring G to the motor output shaft K.

With further reference to Figure 2, escapement pawl H is pivotally supported upon a shaft R which lies in the plane of escapement wheel E, at a right angle to the longitudinal axis of the escapement wheel. Movable member C is disposed parallel to the longitudinal axis of escapement wheel E (and consequently to shaft D), and moves longitudinally back and forth in accordance with variations in a control pressure which is applied via pressure line S to bellows B. Escapement pawl H is permitted to pivot between predetermined limits, through only a relatively small arc, as will be subsequently explained. Escapement wheel E has a plurality of uniformly circumferentially spaced teeth provided thereon, and the operation of the escapement mechanism is such that each time escapement pawl H moves from one limit position to the other the escapement wheel E rotates by a predetermined amount. Thus, when movable member C moves forward a sufficient distance so that pawl H changes from one limit position to the other the electrical switching member F advances in its cycle (rotates) by one step, and when movable member C moves in the backward or reverse direction to restore pawl H to its original limit position the electrical switching member F likewise advances (rotates) by one step. Details of the construction and operation of the escapement mechanism are described subsequently with reference to Figures 9 through 15, inclusive.

The construction and co-operative relationship of electrical switching member F and switch contact elements I will now be described with particular reference to Figures 2, 3, 4 and 6. The details of construction of switching member F will first be described, and then the operation will be explained.

Switching member or commutator F consists of an insulating drum 20 which may suitably be of phenolic material, and upon the outer surface of which a pair of identical toothed metal rings 21a, 21b are press fitted with the teeth thereof in interlocking relationship. The inner circumferential edge of ring 21a has a dozen integrally formed, square teeth 22a circumferentially spaced thereon, with each two adjacent teeth being separated by a square space 23a whose circumferential width is greater than the width of the teeth. The inner circumferential edge of ring 21b has spaced teeth formed thereon in like manner. In the assembled form of the commutator the two rings are therefore never in electrical contact, although the teeth of each ring substantially fully occupy the spaces between the teeth of the opposite ring. The space between the rings, comprising a square wave pattern extending circumferentially around the commutator, is then filled with insulating material 24 of any desired type.

Switch contact elements I are so positioned that the two outer elements slidingly engage the circumferential solid portions of rings 21a and 21b, respectively, while the middle one of the contact elements engages the middle part of the commutator surface which is formed by the pluralities of interlocking teeth 22a, 22b, and insulated spaces 24 therebetween. For any of the two dozen permitted positions of electrical switching member F the middle one of contact elements I squarely engages the surface of one of the teeth 22a or 22b. For each step by which the switching member rotates, the middle one of the contact elements I advances so as to conductively engage the next succeeding one of the teeth 22a, 22b. Thus it will be seen that in the output circuit T the middle conductor is electrically connected first to one and then the other of the outside conductors, in a continuous sequence, as the electrical switching member F rotates through its cycle, a step at a time, under control of the escapement mechanism.

With further reference to Figures 2 through 6, inclusive, the construction and cooperative relationship of the switching mechanism of the invention, and more particularly of the component parts designated by letters D to G and K to Q, will now be described in greater detail.

Escapement wheel E is cylindrical in form having teeth 1, 2, 3 etc. circumferentially spaced on its outer periphery. The interior of the cylinder is hollowed by a large concentric bore 27, and smaller longitudinal bores 28a, 28b, 28c are circumferentially spaced near the outer periphery of the wheel. Dowels 29a, 29b, 29c are inserted in bores 28a–c for fastening wheel E to coupling hub N in longitudinal alignment therewith.

Insulating drum 20 of the switching member F has a large concentric bore 30 extending therethrough, and at one end has a recess formed by large concentric bore 31 so as to receive spring G. Longitudinal bores 32a, 32b, 32c are equally spaced around the base of recess 31 so as to receive dowels 33a, 33b, 33c by which switching member F is fastened to coupling hub N.

Coupling hub N on one end thereof has a cylindrical surface portion 35 which is inserted into cylindrical bore 30 of insulating drum 20 with a press fit. On its other end hub N has a cylindrical surface portion 36 which is inserted into concentric bore 27 of wheel E with a press fit. The intermediate portion of hub N is of larger diameter than its end surfaces 35, 36, and is provided with openings 38a, 38b, 38c for receiving dowels 33a–c, as well as openings 39a, 39b, 39c for receiving dowels 29a–c. It will be noted that openings 38a–c and 39a–c are staggered circumferentially so that dowels 33a–c and 29a–c are interspersed circumferentially of hub N.

Hub N has a concentric longitudinal opening 41 providing a longitudinally separated pair of circumferential body shoulders 42 and 43 which receive bearings 44 and 45, respectively. Each of the bearings is of the ball bearing type and has an inner raceway which circumferentially engages shaft D.

Both wheel E and hub N are preferably made of metal, for example, cast aluminum. Although wheel E, drum 20 and coupling hub N are illustrated as being separate parts which are doweled together, it will nevertheless be understood that other structural forms may be used to accomplish the purposes of the invention. It may be desired, for example, to form wheel E and hub N as an integral unit.

In forming switching member or commutator F the preferred method is to cast and bake a single piece of insulating material having the conductive rings 21a, 21b embedded therein. Concentric bores 30, 31 are then formed, and the outer surface is turned to concentricity. Rings 21a, 21b are then preferably plated, as with silver and rhodium.

Spring collet P on its outer end has circumferential flanges 50, 51 which provide a spool for spring G. Spring G consists of a flat metallic strip which is helically wound, and which in its fully wound condition contains approximately 60 turns. The inner end of spring G is rigidly fastened to collet P as by a threaded screw 53. The outer end of spring G carries a V-shaped fastener 54 which is slidably inserted into a corresponding V-shaped opening 55 provided in the drum 20.

The portion of spring collet P which extends toward motor J carries a plurality of longitudinally extending slots 57 which permit the circumference of the collet to be compressed. Hub O associated with ratchet wheel L has a longitudinally extending slot 60 therein, which slot extends radially through the entire thickness of the hub on one side, and partially through on the opposite side thereof, so as to permit circumferential expansion or contraction of the hub. A threaded bore 61 intersects slot 60 at a right angle, and has one end thereof recessed at 62 to accommodate the head of clamping screw Q. The tightening of clamping screw Q after its insertion into bore 61 clamps hub O upon spring collet P and at the same time securely clamps the latter to output shaft K.

Reference is now made to Figure 7 which schematically illustrates the operation of the pressure control apparatus. Various portions of the apparatus are identified by letters C, F etc. the same as used in the preceding description. Motor J is illustrated as being of the splitphase type in which one winding 65 receives an alternating voltage direct from input circuit U, while the second winding 66 receives the applied voltage at a different phase angle due to the intervention of a capacitor 67. It will be understood that other types of motors, capable of being operated at stall without overheating, may be also used.

Reference is now made to Figure 8 which illustrates graphically the energy storage function of spring G. The vertical co-ordinate is torque while the horizontal co-ordinate is the number of turns the spring is wound. A solid line 70 illustrates the assumed spring characteristic. A dotted line 71 indicates the torque level required to drive the load (commutator) while a dotted line 72 indicates the output torque of motor J.

The motor is selected so that its output torque is substantially less than that required to fully wind the spring. For example, if the spring can be wound to a maximum torque level of one inch ounce, then the output of the motor should be about six tenths of an ounce. The motor is also sufficiently sensitive so as to rewind the spring after a slight diminution of the driving torque thereof, hence the usual operating area of the spring designated as 73 on the graph is very close to the motor torque output 72. The driving torque 71 required for the load is much smaller than motor torque 72, hence in the event of motor failure the spring is able to use stored energy represented on the graph by the large area 74, before it becomes so far spent that it can no longer actuate the commutator. For example, the stored energy of the spring may be sufficient to accomplish a minimum of five revolutions of the commutator, or 120 switching steps.

Reference is made to Figures 9 to 15 inclusive, illustrating the escapement mechanism, which will now be described in detail.

According to the invention a toothed wheel E is adapted to rotate about its axis 100, supported as by a shaft D. A pawl H is positioned adjacent the wheel periphery and is adapted for pivotal movement so that its near end reciprocates along a path substantially parallel to the wheel axis for controlling the wheel rotation. The pawl is provided on its near end with a pair of teeth 101, 102 which are spaced apart circumferentially of the wheel E, and which are inserted alternately into the path of motion of the wheel teeth as the pawl moves pivotally back and forth.

In the drawing pawl H is illustrated as an elongated member extending substantially perpendicularly upward from the periphery of wheel E. Pawl H is pivotally supported by a shaft R at a substantial distance from the pawl teeth 101, 102, the shaft R being disposed with its longitudinal axis exactly perpendicular to the axis of wheel E. A movable member C is adapted for reciprocal movement along an axis parallel to the wheel axis, and is pivotally coupled to pawl H intermediate the shaft R and teeth 101, 102 for producing a pivotal motion of pawl H about the axis of shaft R.

Thus in the presently illustrated form of the invention the pawl teeth 101, 102 move back and forth across the path of motion of the wheel teeth, along an arc which is substantially parallel to the wheel axis. It will be readily appreciated that the movable member C may, if desired, be itself utilized as the pawl so that the pawl teeth 101, 102 reciprocate along a straight line exactly parallel to the axis of wheel E.

Wheel E is adapted for counterclockwise rotation as viewed in Figure 9, as is indicated by an arrow 103. The various wheel teeth are numbered 1, 2, 3 . . . 12, in a clockwise sequence around the periphery of the wheel, the numbering sequence being selected to coincide with the sequence in which the wheel teeth pass under the lower end of pawl H.

Pawl teeth 101, 102 are spaced apart from each other both in a direction parallel to the wheel axis, and in a direction perpendicular thereto, as may best be seen in Figure 14. As viewed in Figure 9 pawl tooth 101 is at the left and pawl tooth 102 is at the right, the pawl teeth being inserted into the path of motion of the wheel teeth from above wheel E. Since wheel E rotates counterclockwise each of the wheel teeth engages first pawl tooth 102, and subsequently pawl tooth 101. Each wheel tooth has a sloped forward surface 105 adapted to engage the pawl teeth. Forward surfaces 105 are not aligned radially with respect to wheel E, but slope back with increasing distance from the wheel axis, at an angle of about 30 degrees in a clockwise direction. Pawl teeth 101, 102 are respectively provided with sloped surfaces 107, 108 for engaging the forward surfaces 105 of the wheel teeth. Surfaces 107, 108 are not quite parallel to each other because they engage the wheel teeth at different rotational positions.

The length of the wheel teeth measured parallel to the wheel axis is designated by the numeral 110 (see Figure 10), and the spacing between pawl teeth 101, 102 measured in the same direction is designated by numeral 111 (see Figure 14). Distance 111 is substantially less than distance 110. Therefore, when the lower end of pawl H occupies a symmetrical position with respect to wheel E both of the pawl teeth 101 and 102 are interposed in the path of motion of the wheel teeth. Movement of the pawl in one direction brings pawl tooth 101 out of the path of the wheel teeth while pawl tooth 102 remains therein. Movement of pawl H in the other direction removes pawl tooth 102 from the path of motion of the wheel tooth, with pawl tooth 101 remaining therein.

The spacing between operative surface 107 of pawl tooth 101 and operative surface 108 of pawl tooth 102, measured circumferentially of wheel E, is designated by a numeral 112 (see Figure 13). The distance between the forward surfaces 105 of two adjacent wheel teeth, measured circumferentially of wheel E, is designated by the numeral 113 (see Figure 12). The distance values are selected so that distance 112 is exactly half as great as distance 113. Thus the leading edge surfaces of the pawl teeth, which engage the forward surfaces of the wheel teeth, are spaced apart circumferentially of the wheel by one-half the circumferential spacing between the forward surfaces of adjacent wheel teeth.

The operation of the escapement is as follows. Wheel E is biased for counterclockwise rotation, by means of spring G. It may be assumed that pawl tooth 101 initially engages wheel tooth number 1 (see Figure 11). Pawl tooth 102 then projects into the space between wheel teeth 1 and 2, and is therefore interposed in the path of wheel tooth 2. It is further assumed that the position of pawl H is symmetrical with respect to wheel E, or on dead center. When movable member C (and consequently the pawl teeth) moves to the right (as shown by solid lines in Figure 10), pawl tooth 101 moves out of the path of the wheel teeth. The result is that wheel E rotates by a distance corresponding to one-half of its tooth spacing. After rotating by this amount the wheel is brought to a stop as the result of the engagement of wheel tooth 2 with pawl tooth 102 (see Figure 12). When movable member C (and consequently the pawl teeth) move to the left as viewed in Figure 10 toward the dotted line position, the result is first that pawl tooth 101 is again interposed in the path of motion of the wheel teeth, and thereafter that pawl tooth 102 is removed from the path of motion of the wheel teeth. The wheel therefore rotates another one-half tooth space and assumes the position shown in Figure 13.

According to the presently illustrated form of the escapement the wheel E moves a half tooth space for each movement of member C in one direction, and also for each movement of member C in the other direction. If it were merely desired to have the wheel E rotate by one tooth space for each complete reciprocation of member C, it would then be unnecessary for the distance 112 to be exactly one-half the distance 113. It would still be necessary, however, for the spacing between the pawl teeth measured circumferentially of wheel E to be at least the thickness of a wheel tooth.

In order for the escapement to operate it is necessary that the two pawl teeth be at least partially out of alignment with each other along the path of motion of the wheel teeth. This makes it possible for one of the pawl teeth to be removed from the path of motion of the wheel teeth, while the other pawl tooth remains interposed therein, with the result that the wheel rotates from a position in which its rotation was inhibited by the removed tooth to a position in which its further rotation is then inhibited by the still remaining tooth.

Shaft R is supported from a member 120, which also rigidly supports a parallel pair of plates 121, 122 which project outward on either side of the upper end of pawl H. When pawl H is pivoted to the extent that either of the pawl teeth 101, 102 is removed from the path of motion of the wheel teeth, further pivotal movement of pawl H is inhibited by the fact that the upper end of the pawl engages the corresponding one of projecting side plates 121, 122. Thus the lower end of pawl H, which carries pawl teeth 101, 102, moves between two limit positions.

In the preceding description it has been mentioned that movable member C is pivotally coupled to pawl H intermediate the shaft R and teeth 101, 102 for producing a pivotal motion of pawl H about the axis of shaft R. Details of this arrangement will now be described.

Shaft R is seated in a bore 125 formed in pawl H. A bore 127 is also formed in pawl H, parallel to bore 125 but nearer to pawl teeth 101, 102. An elliptical passageway 128 extends through pawl H perpendicular to bore 127, and hence parallel to the axis of wheel E. Passageway 128 has its major axis aligned radially of wheel E, and is positioned so as to fully intersect with bore 127.

A cylindrical pivot pin 130 occupies bore 127. Member C, being of smaller diameter than pin 130, extends through a suitable transverse bore provided therein (see Figure 15). A lock bolt 131 is inserted in a threaded bore in one end of pin 130 to lock member C in place. Reciprocation of member C causes pin 130 to pivot within bore 127, while member C also pivots within passageway 128, about the axis of bore 127.

At the upper end of pawl H a bolt 133 is attached, which is utilized as a counterweight in the particular form of the invention illustrated herein.

Other forms and modifications of the invention not specifically illustrated herein will be readily apparent to those skilled in the art.

I claim:
1. A continuously operable converter mechanism comprising, in combination: a member movable along a linear path between two predetermined positions; a cylindrical switching member mounted for rotation about an axis lying parallel to said linear path; a helically wound spring substantially coaxially aligned with said switching member and having one of its ends coupled to said switching member; escapement means cooperatively associated with said switching member and said movable member and operable to permit said switching member to rotate by one predetermined step only when said movable member moves from one to the other of said predetermined positions, said escapement means including a rocker arm mounted for pivotal motion about an axis perpendicular to said axis of rotation of said switching member; electrical contact means supported in sliding engagement with the surface of said switching member and adapted to assume one of two possible switching conditions in accordance with the rotational position of said switching mem- ber; and a normally energized electric motor having an output shaft substantially coaxially aligned with said switching member and drivingly coupled to the other end of said spring for normally maintaining same in a wound condition.

2. A converter mechanism as claimed in claim 1 which further includes ratchet means cooperatively associated with said motor and said spring and adapted to prevent the unwinding of said spring in the event of a failure of the supply of power to said motor.

3. A continuously operable converter mechanism comprising, in combination: a housing; a member movable along a linear path between two predetermined positions relative to said housing; a cylindrical switching member supported from said housing for rotation about an axis lying parallel to said linear path; a wound spring substantially coaxially aligned with said switching member and having one of its ends coupled thereto; escapement means cooperatively associated with said switching member and said movable member and operable to permit said switching member to rotate by one predetermined step whenever said movable member moves from one to the other of said predetermined positions, said escapement means including a rocker arm supported from said housing for pivotal motion about an axis perpendicular both to said linear path and to said axis of rotation of said switching member; electrical switch contact means supported from said housing in sliding engagement with the surface of said switching member and adapted to selectively provide one of two possible switching conditions for an associated electrical circuit, one of said switching conditions corresponding to the presence of said movable member in one of said predetermined positions and the other of said switching conditions corresponding to the presence of said movable member in the other of said predetermined positions; a normally energized electric motor supported from said housing and having an output shaft drivingly coupled to the other end of said spring for normally maintaining same in a wound condition; and ratchet means cooperatively associated with said motor and said spring and adapted to prevent the unwinding of said spring in the event of a failure of the supply of power to said motor.

4. A continuously operable converter mechanism comprising, in combination: a housing; a first shaft supported from said housing; a movable member adapted for linear movement along a predetermined path parallel to said first shaft; a toothed escapement wheel supported upon said first shaft and rotatable thereupon relative to said housing; a cylindrical electrical switching member rigidly coupled to said escapement wheel for rotation in synchronism therewith, said switching member having spaced conductive surface portions thereon; a helically wound spring coaxially aligned with said switching member and having one of its ends coupled thereto; an elongated escapement pawl pivotally supported from said housing for rotation about an axis which lies at a right angle to the axis of said escapement wheel, one end of said escapement pawl having a pair of teeth engageable with the teeth of said escapement wheel for normally inhibiting the rotation thereof, said escapement pawl being pivotally coupled to said movable member and operable in response to movement of said movable member to move from one to the other of two alternate positions, the action being such that upon completion of each pivotal movement said escapement pawl releases said escapement wheel to permit a predetermined increment of rotation of said escapement wheel and switching member; electrical switch means supported from said housing in sliding engagement with the surface of said switching member and adapted to provide different switching conditions corresponding to different rotational positions of said switching member; a normally energized electric motor rigidly supported from said housing, having an output shaft substantially coaxially aligned with said first shaft and coupled to the other end of said spring; a ratchet wheel rigidly coupled to said output shaft in concentric relationship therewith; and a ratchet pawl rigidly supported from said housing in engagement with said ratchet wheel for permitting said output shaft to rotate only in such a direction as to wind said spring.

5. In a pressure control apparatus including an extensible bellows, means for supplying a control pressure to the bellows, and a two-condition electrical output circuit, the combination with said bellows and said output circuit of electrical switching mechanism comprising, in combination: a switching member having an operational cycle including a plurality of separate steps, and cooperatively associated with said output circuit for changing said output circuit from its existing condition to its other condition each time that said switching member advances by one step; spring means drivingly coupled to said switching member for causing said switching member to advance through its operational cycle; escapement means associated with said switching member for normally inhibiting the advancement thereof and operable when actuated to permit said switching member to advance by one step only; coupling means associated with said bellows and said escapement means and responsive to a predetermined change in the bellows extension for actuating said escapement means; and normally energized, electrically operated means for maintaining the driving energy of said spring.

6. Pressure control apparatus comprising, in combination: a housing; a pressure-responsive device rigidly supported from said housing and including a movable member adapted for linear movement along a predetermined axis in response to variations of an applied pressure; a first shaft supported from said housing parallel to said axis; a toothed escapement wheel supported upon said first shaft and rotatable thereupon relative to said housing; a cylindrical electrical switching member rigidly coupled to said escapement wheel for rotation in synchronism therewith, said switching member having spaced conductive surface portions thereon; a helically wound spring having one of its ends drivingly coupled to said switching member; an elongated escapement pawl supported from said housing for pivotal movement about an axis which lies at a right angle to the axis of rotation of said escapement wheel, one end of said escapement pawl having teeth in engagement with the teeth of said escapement wheel for normally inhibiting the rotation thereof, said escapement pawl being pivotally coupled to said movable member and operable in response to movement thereof to move from one to the other of two alternate positions, the action being such that upon completion of each pivotal movement said escapement pawl releases said escapement wheel to permit a predetermined increment of rotation of said escapement wheel and switching member; electrical switch means supported from said housing in sliding engagement with the surface of said switching member and adapted to provide different switching conditions corresponding to different rotational positions of said switching member; a normally energized electric motor rigidly supported from said housing, having an output shaft substantially coaxially aligned with said first shaft and coupled to the other end of said spring; a ratchet wheel rigidly coupled to said output shaft in concentric relationship therewith; and a ratchet pawl rigidly supported from said housing in engagement with said ratchet wheel for permitting said output shaft and ratchet wheel to rotate only in such a direction as to wind said spring; the action of the apparatus being such that said motor normally maintains said spring in somewhat less than a fully wound condition, said ratchet pawl being effective in the event of a failure of the energy supply to the motor to prevent unwinding of said spring and the stored energy of the spring being sufficient to drive said switching member through a plurality of successive switching operations.

7. Electrical switching mechanism comprising, in combination: a rotatably mounted electrical switching member adapted to sequentially occupy a plurality of separate switch positions during each complete revolution thereof; an independently rotatable shaft mounted adjacent said switching member and substantially in coaxial alignment therewith; a helically wound spring adapted to comprise a large number of turns when fully wound and having its two ends coupled to said shaft and said switching member, respectively; escapement means cooperatively associated with said switching member for normally inhibiting rotation thereof and selectively operable to permit said member to rotate from one switch position to the next; and automatically operable means drivingly coupled to said shaft for maintaining said spring sufficiently fully wound to store enough reserve energy to drive said switching member through at least several revolutions, said shaft having ratchet means associated therewith for preventing reverse rotation thereof in the event of failure of said automatically operable means.

8. Electrical switching mechanism as claimed in claim 7 in which said switching member has a concentric opening in one end thereof, and said spring has a flat metal strip disposed within said opening and helically wound substantially in a plane perpendicular to the axis of said member with its inner end coupled to said shaft and its outer end coupled to said member.

References Cited in the file of this patent
UNITED STATES PATENTS

| | | |
|---|---|---|
| 2,096,620 | Robertson | Oct. 19, 1937 |
| 2,631,664 | Poole | Mar. 17, 1953 |
| 2,820,860 | Kozikowski et al. | Jan. 21, 1958 |
| 2,821,583 | Kielman | Jan. 28, 1958 |
| 2,832,854 | Doyle et al. | Apr. 29 1958 |